(12) United States Patent
Shing et al.

(10) Patent No.: US 9,883,731 B2
(45) Date of Patent: Feb. 6, 2018

(54) ADJUSTABLE BENDING FORCE ASSEMBLY

(71) Applicant: Microsoft Technology Licensing, LLC, Redmond, WA (US)

(72) Inventors: Leo See Hoo Shing, Redmond, WA (US); Andre Sutanto, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/851,970

(22) Filed: Sep. 11, 2015

(65) Prior Publication Data
US 2017/0071320 A1  Mar. 16, 2017

(51) Int. Cl.
*A45F 5/00* (2006.01)
*A45D 8/36* (2006.01)
(Continued)

(52) U.S. Cl.
CPC .................. *A45F 5/00* (2013.01); *A44C 5/12* (2013.01); *A45D 8/36* (2013.01); *H04R 5/0335* (2013.01);
(Continued)

(58) Field of Classification Search
CPC ....... H04R 5/033; H04R 5/0335; H04M 1/05; A42B 3/145; A44C 5/12; A44C 5/2071
(Continued)

(56) References Cited

U.S. PATENT DOCUMENTS 2,075,196 A * 3/1937 Hand .................... H04R 1/1066
                                                                381/377
2,213,118 A * 8/1940 Bowers .................. A42B 3/145
                                                                2/8.1
(Continued)

FOREIGN PATENT DOCUMENTS

| DE | 102009033726 A1 * | 1/2011 | ........... H04R 5/0335 |
| WO | 2006002460 A1 | 1/2006 | |
| WO | WO-2014142681 | 9/2014 | |

OTHER PUBLICATIONS

"International Search Report and Written Opinion Issued in PCT Application No. PCT/US2016/045664", dated Nov. 9, 2016, 10 pages.
(Continued)

*Primary Examiner* — Justin Larson
*Assistant Examiner* — Phillip Schmidt

(57) ABSTRACT

An adjustable bending force assembly is described for use with components that are securable to objects via applied bending force. In implementations, the adjustable bending force assembly is formed as part of a band that exerts bending force upon objects inserted within the band (e.g., between the ends of the band). The adjustable bending force assembly includes one or more stiffener elements that are adjustably positionable at multiple different positions along a length of the band to vary the amount of bending force. In one approach, the stiffener elements are configured as plates that slide into different positions to adjust the bending force. The adjustable bending force assembly may be included as (Continued)

an integrated component of a wearable device, such as a watch or headband. Alternatively, a band can be configured as a separate component to which a device can readily be attached and detached through manual force.

20 Claims, 9 Drawing Sheets

(51) Int. Cl.
*A44C 5/12* (2006.01)
*H04R 5/033* (2006.01)
*F21V 21/00* (2006.01)
*H04M 1/05* (2006.01)
*A44C 5/00* (2006.01)

(52) U.S. Cl.
CPC .......... *A44C 5/0007* (2013.01); *A44C 5/0053* (2013.01); *A45F 2005/008* (2013.01); *A45F 2200/0508* (2013.01); *A45F 2200/0516* (2013.01); *F21V 21/00* (2013.01); *H04M 1/05* (2013.01)

(58) Field of Classification Search
USPC .................. 224/181; 2/417, 209.13; 379/430; 381/374, 377, 379
See application file for complete search history.

(56) References Cited

U.S. PATENT DOCUMENTS

| | | | |
|---|---|---|---|
| 5,117,465 A * | 5/1992 | MacDonald | H04R 1/10 381/150 |
| 5,185,807 A * | 2/1993 | Bergin | H04R 1/1066 181/128 |
| 5,526,006 A | 6/1996 | Akahane et al. | |
| 5,605,262 A | 2/1997 | Bond | |
| 6,237,319 B1 | 5/2001 | Amundsen et al. | |
| 6,428,490 B1 | 8/2002 | Kramer et al. | |
| 8,336,240 B2 | 12/2012 | Gray et al. | |
| 2001/0020144 A1 | 9/2001 | Heinz et al. | |
| 2005/0013086 A1 | 1/2005 | Apotheloz et al. | |
| 2005/0262619 A1 | 12/2005 | Musal et al. | |
| 2007/0220919 A1 | 9/2007 | Loetscher et al. | |
| 2009/0044808 A1 | 2/2009 | Guney et al. | |
| 2009/0323978 A1 | 12/2009 | Leske et al. | |
| 2010/0189303 A1* | 7/2010 | Danielson | H04R 1/1008 381/378 |
| 2011/0209375 A1 | 9/2011 | Padgett et al. | |
| 2011/0268290 A1* | 11/2011 | Lee | H04R 5/0335 381/74 |
| 2012/0099754 A1* | 4/2012 | Petersen | H04R 1/1066 381/379 |
| 2013/0326790 A1 | 12/2013 | Cauwels et al. | |
| 2014/0263493 A1* | 9/2014 | Amurgis | H04R 5/0335 224/181 |
| 2015/0177782 A1 | 6/2015 | Saitoh et al. | |

OTHER PUBLICATIONS

"PUSH: The first fitness tracking device that measures strength", Retrieved from <https://www.indiegogo.com/projects/push-the-first-fitness-tracking-device-that-measures-strength#/story> on Jul. 20, 2015, Oct. 2013, 30 pages.

\* cited by examiner

800 →

802
Form a semi-rigid, arcuate shaped band for securing of a wearable device to an object positioned within an interior of the band by bending force exerted by the band

↓

804
Arrange one or more stiffener plates for the band that are positionable at different positions along a length of the band to adjust the bending force

*Fig. 8*

ADJUSTABLE BENDING FORCE ASSEMBLY

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 8 is a flow diagram depicting an example procedure for formation of an adjustable bending force assembly in accordance with one or more implementations.

DETAILED DESCRIPTION

Overview

Figure 1:
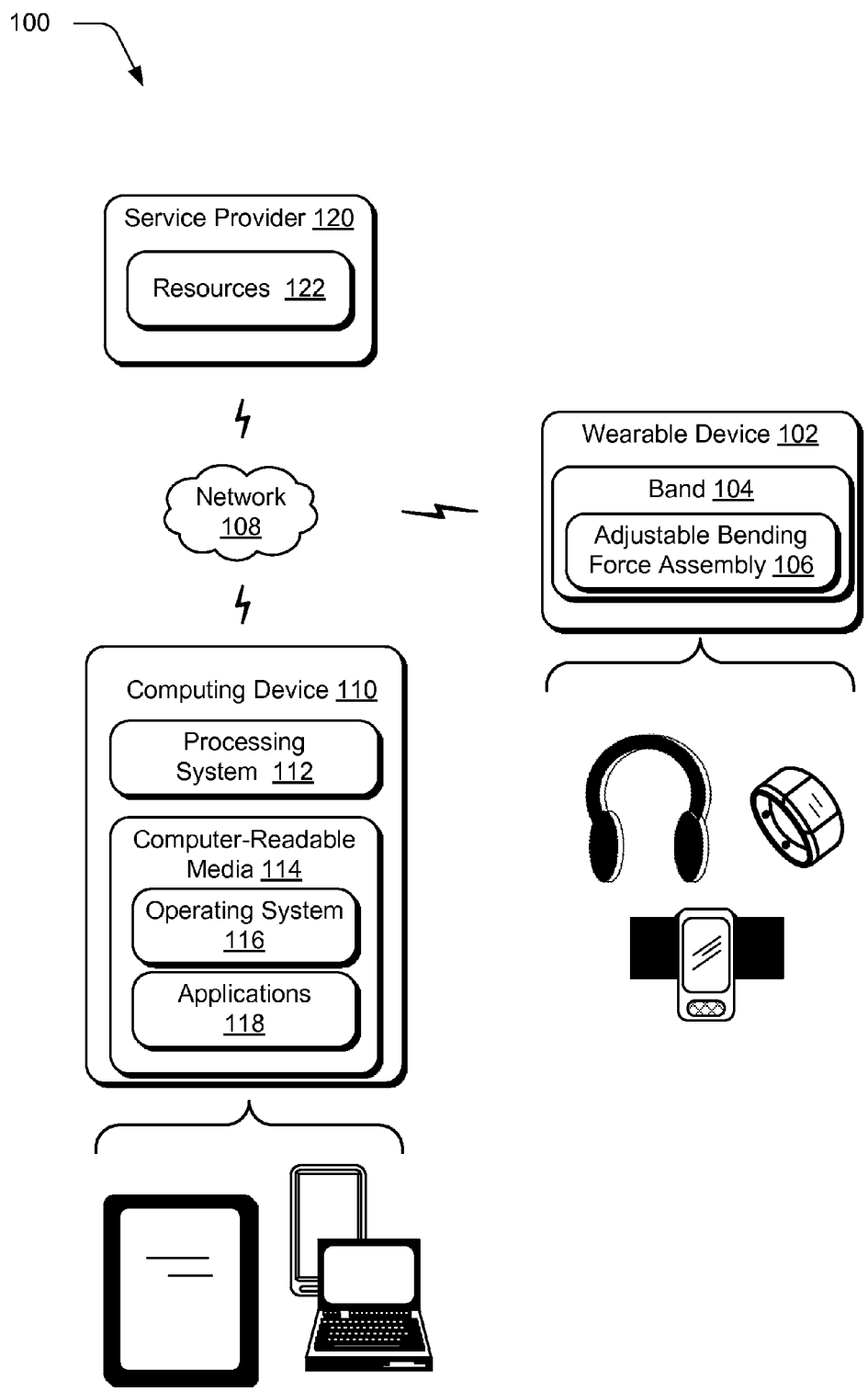
FIG. 1 is an illustration of an example environment in accordance with one or more implementations.

Computing devices have been developed to increase the settings in which computing functionality is made available to users. For instance, mobile phones and slate form factor devices (e.g., tablets) have advanced to provide access to content, applications, services, browsing, and other computing functionality in mobile settings. Additionally, availability and use of various kinds of wearable computing devices that provide computing functionality (e.g., watches, fitness bands, pod devices, glasses, headphones, a headband, etc.) is steadily increasing. For devices and other components that users are likely to carry with them, bands are used to enable the users to secure the devices to objects (e.g., body parts and/or items such as a stand or holder). Since different people have different perceptions of comfort, user satisfaction with a product can depend in part upon adjustability to suit individual users.

An adjustable bending force assembly is described herein for use with components designed to be secured to an object via applied bending force. In one or more implementations, the adjustable bending force assembly is formed as an arcuate or c-shaped band that exerts bending force that secures the band to an object when the object is inserted within the band (e.g., between the ends of the band). The adjustable bending force assembly includes one or more stiffener elements that are adjustably positionable at multiple different positions along a length of the band to vary the amount of bending force that is exerted. In one approach, the stiffener elements are configured as plates that slide into different positions to adjust the bending force. In another example, the band is configured as a track or sliding hinge assembly having stiffener element(s) that interlock with the band and are slidable along the length of the band. In this arrangement the stiffener may be held in place in part by friction and by deformation of the band when in use. The adjustable bending force assembly may be included as an integrated component of a wearable device, such as a headband, watch, or headphones. Alternatively, an attachable band having adjustably positionable stiffener elements can be configured as a separate component to which a device can readily be attached and detached through manual force. Adjustable bending force assemblies and techniques as described herein provide a convenient and straightforward mechanism for users to adjust bending force for a wearable item and thereby increase the users' comfort and satisfaction.

In the following discussion, an example environment is first described that can employ adjustable bending force assemblies as described herein. Example details of the adjustable bending force assemblies and implementations of devices that can utilize the assemblies are then described, which may be implemented in various environments. Example procedures related to the example adjustable bending force assemblies are described thereafter. Lastly, an example computing system is described that can employ adjustable bending force assemblies in one or more implementations.

Operating Environment

FIG. 1 depicts generally at 100, an example operating in accordance with one or more implementations. In particular, the operating environment 100 includes a wearable device 102 that includes or makes use of a band 104 designed to secure the wearable device to an object via applied bending force. As used herein, an object refers to body parts of a person such as a wrist, ankle, or head and to items such as a stand or holder. A wearable device is designed to be worn by, attached to, carried by, or otherwise transported by a user. Examples of wearable devices 102 depicted in FIG. 1 include, a smart fitness band or watch, headphones, and clip-on devices such as a fitness device, mobile phone, media player, or tracker. Other examples of wearable devices include but are not limited to a ring, an article of clothing, a glove, protective gear, sports pads, and a bracelet, to name a few examples. Accordingly, various types of devices having different types of device components and computing functionality are contemplated that are suitable for use with bands and adjustable bending force techniques as described herein.

Generally, the band 104 is configured as a curved (e.g., arcuate shaped) component that is formed from semi-rigid and flexible materials, which can include metals, plastic, polymers, composites and/or combinations thereof. By way of example, the band 104 may be configured to have a semi-circular, c-shaped, spiral or other arcuate shape with an open interior portion between opposing ends of the band. The band 104 is designed to secure to an object that is inserted or positioned within the open interior portion due to bending force that is exerted in reaction to flexing of the band (e.g., beam bending) to accommodate the object. A band 104 may be an integrated component of device such as for an adjustable headband/headset device, headphones, or a watch. Alternatively, the band 104 may be a separate, attachable band that is designed to readily attach to and detached from a compatible device (such as a mobile phone, tracker, sensor, or other electronic component) through manual force (e.g., removable without requiring tools or complex disassembly). In this scenario, a user is able to easily switch between using a device as a wearable device when attached to the band and as a handheld device when detached from the band.

In accordance with techniques described in this document, the band 104 includes an adjustable bending force assembly 106 designed to enable adjustments and customizations of the bending force that is exerted by the band 104. Varying of the bending force via the adjustable bending force assembly 106 enables users to decide how securely the band is attached and/or adjust the band for desired comfort. As discussed in greater detail below, different magnitudes of bending force can be achieved by using stiffener elements that are positionable at different positions along a length of the band. Details regarding these and other aspects of adjustable bending force assemblies are discussed in relation to the following figures.

Wearable devices 102 and other devices described herein can be implemented with various components, such as one or more processors and memory devices, as well as with any combination of differing components. For instance, a device may include a full complement of processing, memory, and software resources. Some devices, such as some wearable devices, may be configured to have a limited set of resources (e.g., basic memory, a simple controller, and/or limited applications). One example of a computing system that can represent various systems and/or devices is shown and described below in relation to FIG. 9.

Wearable devices 102 may be further designed to interact with and/or be used along with other devices via various wired or wireless connections (e.g., Wi-Fi, Bluetooth, cellular, etc.). For instance, headphones may connect to and be used with a mobile phone or media player, a watch may connect wirelessly to a tablet device, and a tracker device may be designed to communicate data to and/or receive data from an online service, and so forth.

Accordingly, the example operating environment 100 further represents that the wearable device 106 may be communicatively coupled via a network 108 to a computing device 110, which enables the wearable device 106 to access, interact with, and take advantage of resources and functionality made available through the computing device 110. The computing device 110 is represented as having a processing system 112 with one or more processors and processing components (e.g., CPUs, GPUs, microcontrollers, hardware elements, fixed logic devices, etc.), one or more computer-readable media 114, an operating system 116, and one or more applications 118 that reside on the computer-readable media and which are executable by the processing system. The processing system 112 may retrieve and execute computer-program instructions from applications 118 to provide a wide range of functionality for the computing device 110, including but not limited to gaming, office productivity, email, media management, printing, networking, web-browsing, and so forth. A variety of data and program files related to the applications 118 can also be included, examples of which include games files, office documents, multimedia files, emails, data files, web pages, user profile and/or preference data, and so forth.

In implementations, the computing device 110 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 9.

The environment further depicts that the computing device 110 and/or wearable device 102 may be communicatively coupled via the network 108 to a service provider 120, which enables access to and interaction with various resources 122 made available by the service provider 120. The resources 122 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Adjustable Bending Force Assembly Details

Figure 2:
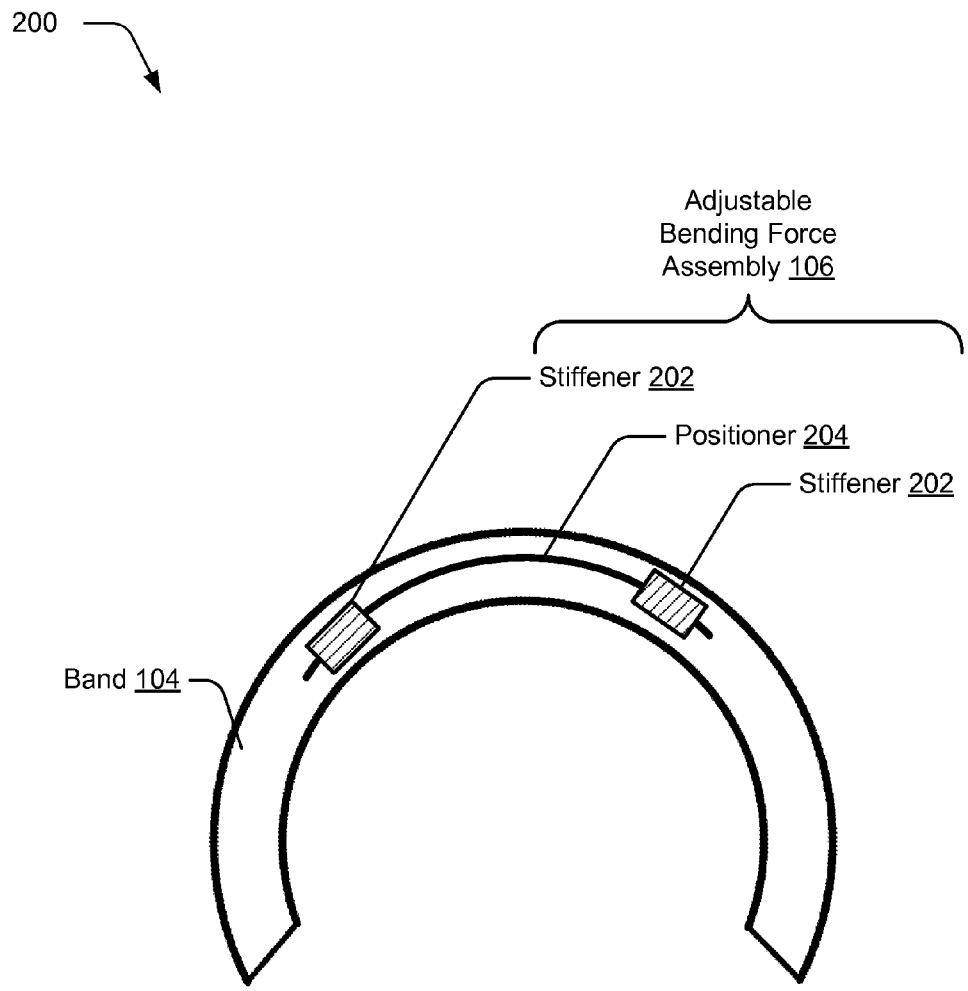
FIG. 2 depicts details of an example band having an adjustable bending force assembly in accordance with one or more implementations.

FIG. 2 depicts generally at 200 an example band 104 having an adjustable bending force assembly 106 in accordance with one or more implementations. In the depicted example, the band 104 is formed as an arcuate or "c-shaped" band that exerts bending force that secures the band to an object when the object is inserted within the band (e.g., between the ends of the band). The adjustable bending force assembly includes one or more stiffener 202 elements that are adjustably positionable at multiple different positions along a length of the band to vary the amount of bending force that is exerted. The stiffeners 202 are attached to and/or may be moved to multiple different positions of a positioner 204 element. Stiffeners 202 can be configured in any suitable way. For example, the stiffeners may be formed as metal, plastic, or composite elements of varying sizes and shapes. Generally, the stiffeners 202 are formed from material that is more rigid than the band and are designed to change the rigidity of the band at the different positions, which in turn adjusts the bending force. In one approach, the stiffening elements are configured as substantially rectangular plates (as illustrated) that are slidably positionable into different positions along the length of the positioner 204 to adjust the bending force. The stiffening elements can be held in place at different locations using various fastening mechanisms and/or fasteners, including but not limited to screws, pinning mechanisms, snap together designs, clips, and so forth. In another example, the band is configured as a track or sliding hinge assembly having stiffener element(s) that interlock with the band and are slidable along the length of the band. This is comparable to an arcuate shape drawer slide assembly. In other words, the stiffener elements may be inserted into the track or hinge and then moved to different positions. A tight fight between the interlocking portions provides friction to partially keep the stiffener from sliding without applied force. Additionally, when in use (e.g., a user is wearing the band), deformation of the band keeps the stiffener from sliding and thereby "locks" the stiffener in place. In this arrangement, the friction and deformation forces may be relied upon to constrain the movement of the stiffener without additional fastening mechanisms.

As illustrated, two stiffeners arranged on opposing sides of the band may be employed in some implementations. In such an arrangement, each stiffener is configured to enable control over the rigidity and bending force for a corresponding side of the band. The two stiffeners can be adjusted together to control the overall bending force. Although two stiffeners are represented in the example of FIG. 2, different arrangements are contemplated that may include more than two stiffeners or a single stiffener.

The positioner 204 may also be configured in various ways to establish different positions for attachment of the stiffeners 202 and facilitate moving and securing of the stiffeners 202 at different positions. The positioner 204 extends at least partially along a surface of the band. The positioner 204 may be a continuous element (as illustrated) such as a slot or ridge along which complementary stiffeners 202 may slide or otherwise be positioned at different positions. In an implementation, stiffeners 202 may be moved to any position along the length of the positioner 204 between points corresponding to maximum and minimum bending force. In other words, discrete positions are not defined between the maximum and minimum points and the bending force is continuously variable across the available bending force range supported by the positioner 204.

In addition or alternatively, the positioner 204 may include a number of discrete positions defined by holes, snaps, indentations, protrusions, slots, ridges, or other suitable attachment points for the stiffeners 202. In this approach, the positioner 204 can be configured as, or to include, a series of segmented attachment points for the stiffeners that define the discrete positions. Thus, the bending force adjustments are constrained to values attainable at the discrete positions.

Figure 3:
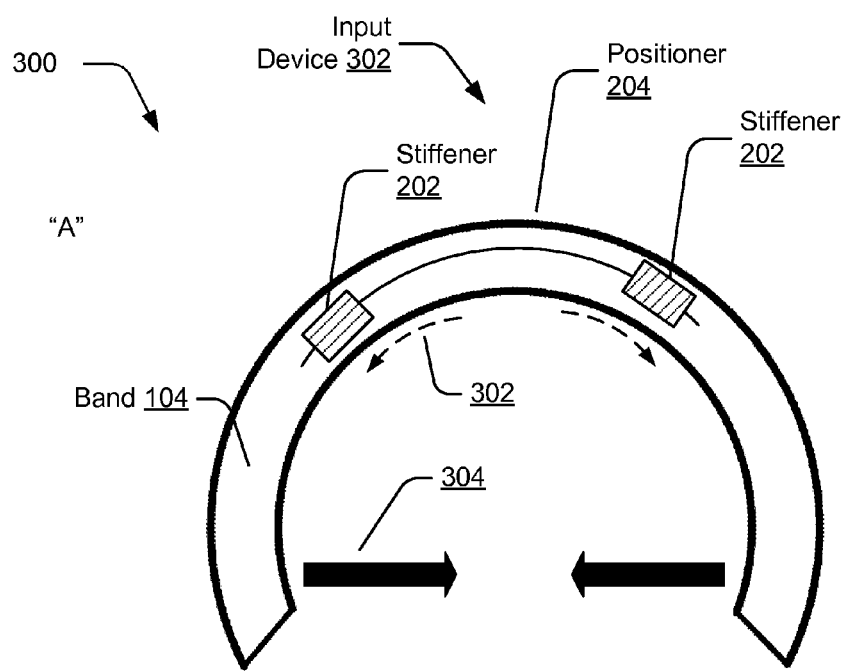
FIG. 3 depicts an example scenario showing adjustment of bending force in accordance with one or more implementations.
Figure 3:
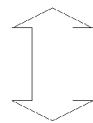
Figure 3:
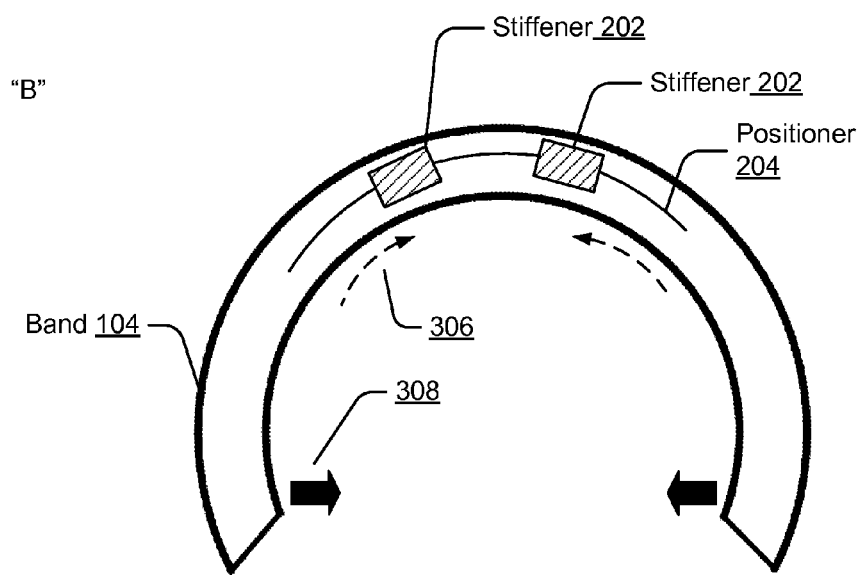

To further illustrate consider FIG. 3, which depicts generally at 300 an example scenario showing adjustment of bending force in accordance with one or more implementations. In particular, FIG. 3 depicts different views "A" and "B" of the example band of FIG. 2 having the adjustable bending force assembly 106 with stiffeners 202 in different positions. As noted, stiffeners 202 may be configured as plates or other suitable elements that are designed to attach to a positioner 204 at different positions. For example, stiffeners be configured with protrusions that engage with complementary indentations of the positioner 204, or vice versa. By way of example, ridges formed on a stiffener may enable sliding of the stiffener along the positioner in the form of a slot that runs longitudinally along a surface of the band. Alternatively, a stiffener in the form of a slotted plate may be designed to slide along a positioner having a compatible raised ridge/track or a series of protruding elements. Other configurations are also contemplated, some examples of which are discussed in relation to the following figures.

View A in FIG. 3 represents manipulation 302 of the stiffeners 202 outward to position the stiffeners 202 relatively close to the ends of the band/positioner. Manipulation of the positioners outward toward the ends generally increases the rigidity of the band 102 in the area around the ends of the band and consequently increases bending force that is exerted upon an object inserted between the ends, as represented by arrows 304. On the other hand, view B represents manipulation 306 of the stiffeners 202 inward to position the stiffeners 202 relatively close to the middle of the band/positioner. Manipulation of the positioners inward generally decreases the rigidity of the band 102 in the area around the ends of the band and consequently decreases bending force that is exerted upon an object inserted between the ends, as represented by arrows 308. Thus, moving stiffeners 202 to different positions results in changes to the magnitude of the bending force, which is represented by the different sizes of arrows 304 in view A and arrows 308 of view B. Generally, the stiffeners 202 are positionable to various different positions radially along the length of the arcuate shaped band to adjust the bending force accordingly.

Figure 4:
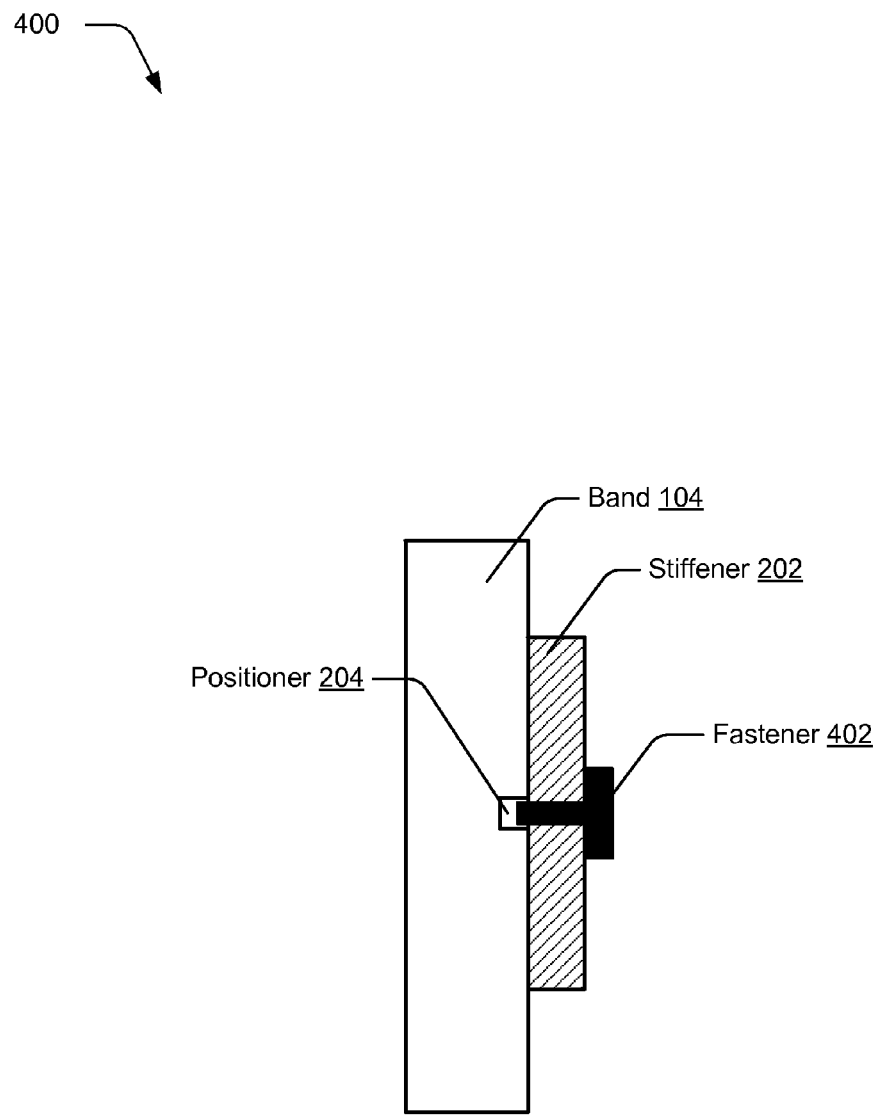
FIG. 4 depicts an example implementation of an adjustable bending force assembly in accordance with one or more implementations.

FIG. 4 depicts generally at 400 an example implementation of an adjustable bending force assembly in accordance with one or more implementations. In particular, a cross sectional view of the band 104 is shown. In this example, the positioner 204 is configured as a slot that runs longitudinally along the band 104. The positioner 204 may be formed on an interior surface that face the open space between ends of the band or an exterior surface of the band that opposes the interior surface. The stiffener 202 is arranged as a plate in planar relationship to the surface of the band having the positioner 204. A fastener 402 is depicted that represents various mechanisms that may be employed to secure the stiffener 202 at different positions. By way of example, the fastener 402 may be configured as a pin or screw that passes through the stiffener 202 and engages the positioner 204 at different locations along the slot to secure the stiffener.

Figure 5:
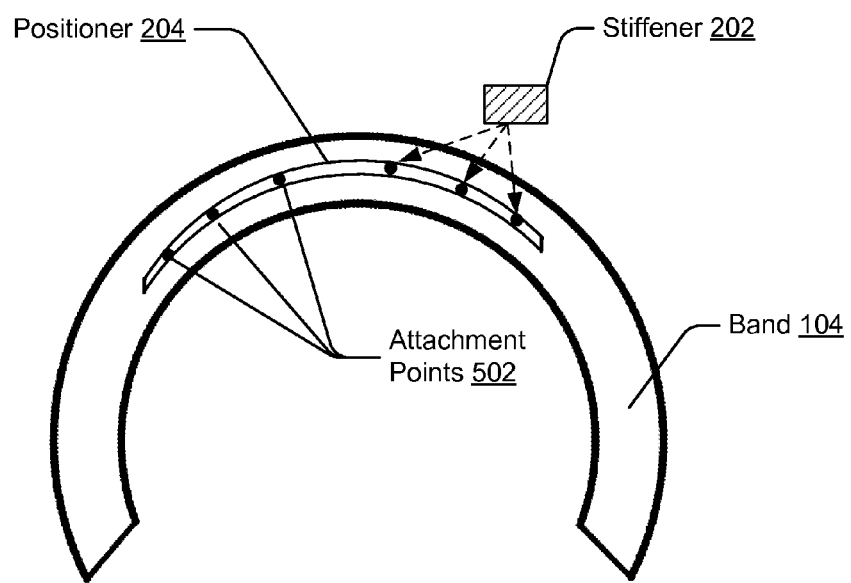
FIG. 5 depicts an example implementation of a positioner element for an adjustable bending force assembly accordance with one or more implementations.

As noted, the positioner 204 may be configured to include discrete attachment points for stiffeners 202, such as holes, slots, indentation, protrusions or other mechanisms suitable to engage with complementary fasteners or features associated with the stiffeners to enable positioning and securing of stiffeners at different locations. In this context, FIG. 5 depicts generally at 500 an example implementation of a positioner 204 for an adjustable bending force assembly accordance with one or more implementations. In this example, the positioner 204 includes a series of attachments points 502, such as circular indentations or holes that can mate with a fastener 402 or comparable fastening component suitable to secure a stiffener 202 to the positioner and band. Attachments points 502 may also be configured as a series of protrusions designed to engage slots, grooves or other indentations associated with stiffeners. As represented, the stiffener 202 may engage with different attachments points 502 to set the bending force to a particular level and adjust the bending force to different levels for different situations and users.

Figure 6:
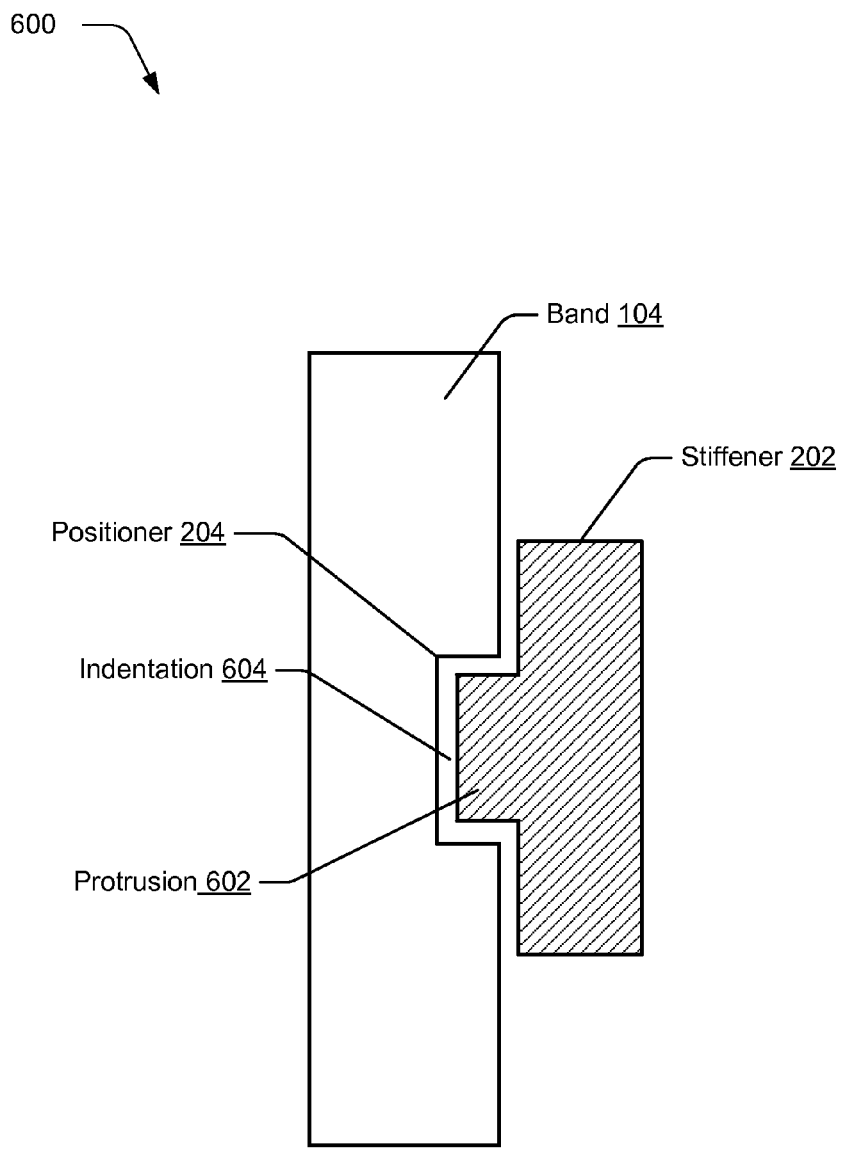
FIG. 6 depicts another example implementation of an adjustable bending force assembly in accordance with one or more implementations.
Figure 7:
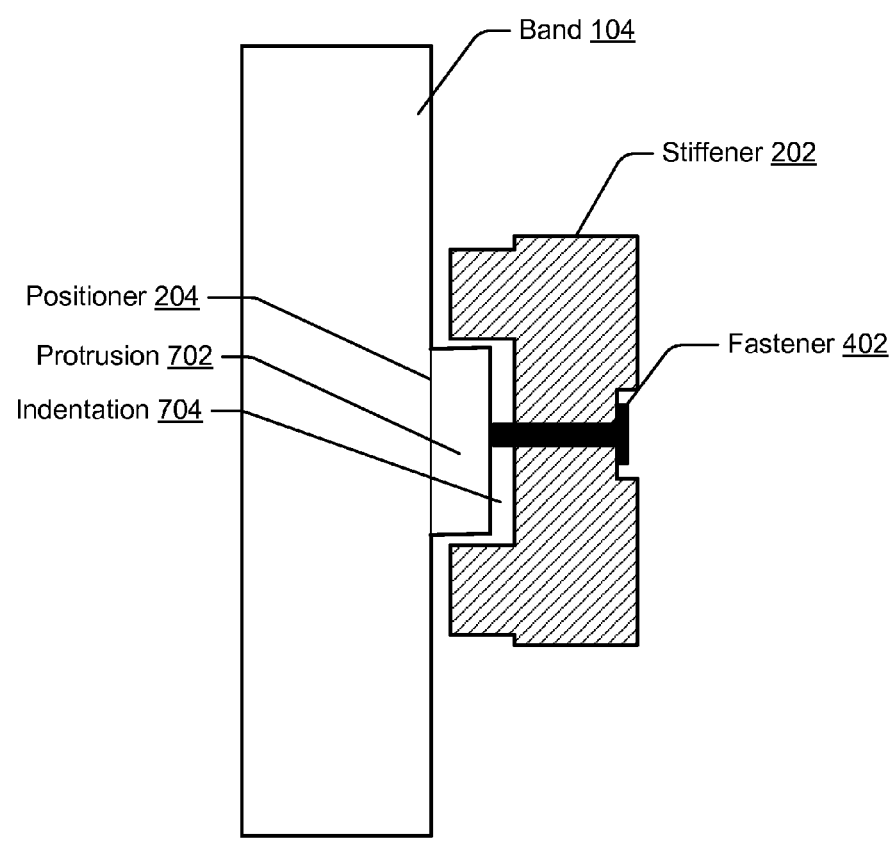
FIG. 7 depicts yet another example implementation of an adjustable bending force assembly in accordance with one or more implementations.

Additional examples of adjustable bending force assemblies are depicted in FIG. 6 and FIG. 7. In particular, FIG. 6 depicts generally at 600 another example implementation of an adjustable bending force assembly in accordance with one or more implementations. In the example of FIG. 6, the stiffener 202 is configured to include a protrusion 602 that is designed to engage a complementary indentation 604 of the positioner 204. Here, the protrusion 602 may be a ridge or raised portion that mates with a corresponding slot, hole or other indentation 604. In an implementation, the stiffener 202 is designed to removable "snap-in to place" when sufficient force (e.g., manual force) is applied to cause insertion of the protrusion 602 into the indentation 604. The stiffener 202 is designed to be removed, such as by sufficient manual force to disengage the protrusion 602 from the indentation 604. The stiffener 202 may then be moved to a different position and snapped-in at that position. Alternatively, pins, screws or other mechanical fasteners (not shown) may be employed to removably secure the stiffener 202 to the band/positioner.

FIG. 7 depicts generally at 700 yet another example implementation of an adjustable bending force assembly in accordance with one or more implementations. In the example of FIG. 7, the positioner 204 is configured to include a protrusion 702 that is designed to engage a complementary indentation 704 of the stiffener 204. Once again, the protrusion 702 may be a ridge or raised portion that mates with a corresponding slot, hole or other indentation 704. In an implementation, the stiffener 202 is designed to removably "snap-onto" the protrusion 702 when sufficient force (e.g., manual force) is applied. The stiffener 202 is designed to be removed, such as by sufficient manual force to disengage the stiffener from the protrusion 702. The stiffener 202 may then be moved to a different position and snapped-on at that position. As represented, a fastener 402 as discussed herein can be employed in addition to or in lieu of using snap together components to removably secure the stiffener 202 to the band/positioner. In an implementation, the stiffener is configured as a slotted plate that slides along one or more protrusions implemented by the positioner to achieve different positions and corresponding levels of bending force. Various other configurations of an adjustable bending force assembly that uses movable stiffeners to adjust bending force are also contemplated.

Example Procedure

In the context of the foregoing example devices, techniques, and details, this section described an example procedure in accordance with one or more implementations of adjustable bending force assemblies. The procedure is represented as a set of blocks that specify operations performed by one or more entities and are not necessarily limited to the orders shown for performing the operations by the respective blocks. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

FIG. 8 is a flow diagram depicting an example procedure 800 for formation of an adjustable bending force assembly in accordance with one or more implementations. A semi-rigid, arcuate shaped band is formed for securing of a wearable device to an object positioned within an interior of the band by bending force exerted by the band (block 802). For example, an arcuate shaped band may be formed for headphones, a watch, or other device. The band may be formed as an integrated component for a device or as an attachable band that can be selectively attached and detached from the device as noted previously. The band is formed as a component that flexes to at least some degree. The band may be semi-rigid. Flexing of the band produces bending force that can be used to secure the band to an object in the manner previously discussed. The band may be formed using metal, plastic, polymer, and composites materials.

One or more stiffener plates are arranged for band that are positionable at different positions along a length of the band to adjust the bending force (block 804). In particular, the band is configured to include an adjustable bending force assembly that uses movable stiffeners to adjust bending force. The adjustable bending force assembly can be configured in various ways in accordance with the examples and concepts discussed in this document. The band having the adjustable bending force assembly can then be fixedly connected to device components to form an integrated, wearable device. Alternatively, the band may be configured with a connector or connection mechanism designed to physically connect to a compatible device and secure the compatible device in a removable, non-permanent manner. In this approach, an attachable band is formed that can be selectively attached and detached from a compatible device using manual force (e.g., without tools or complex disassembly).

Example System

Figure 9:
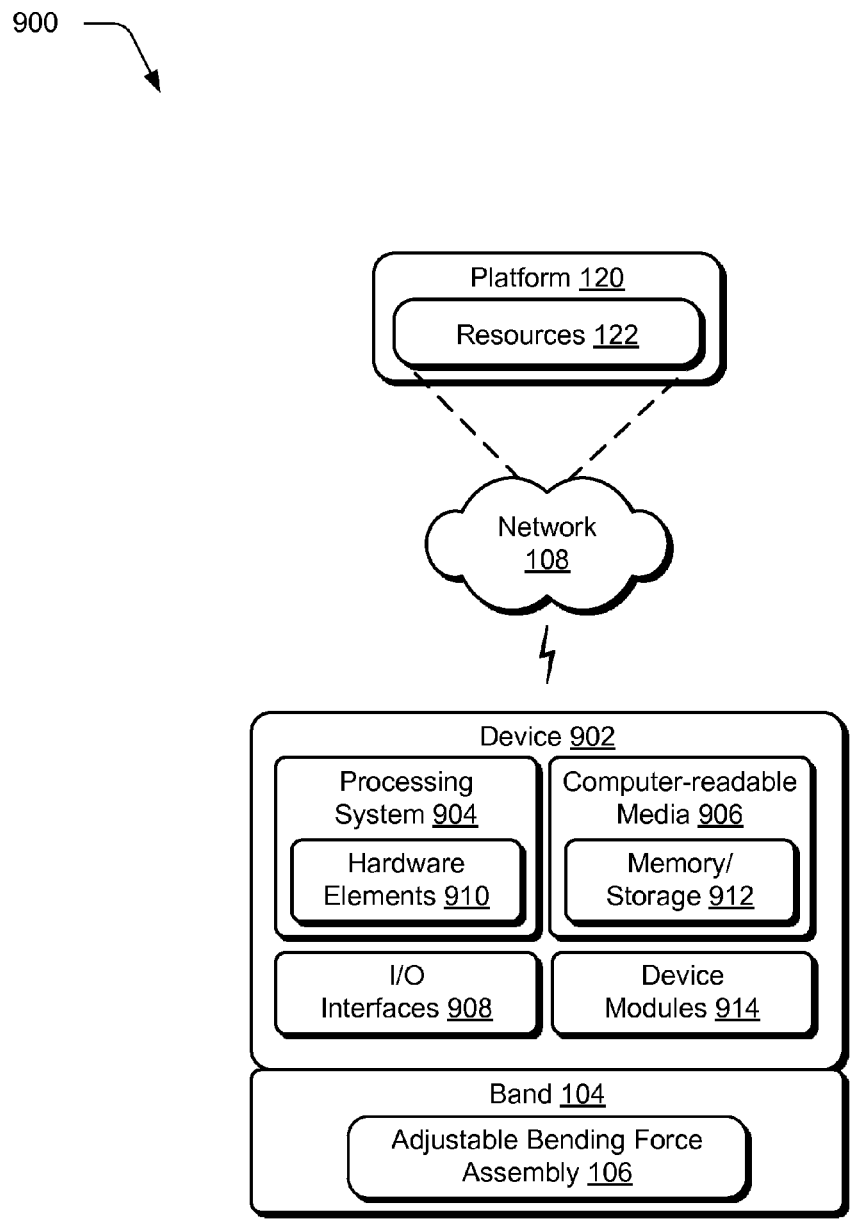
FIG. 9 illustrates various components of an example system that can be employed to implement devices and techniques related to adjustable bending force assemblies as described herein.

FIG. 9 illustrates an example system 900 that includes an example computing device 902 that is representative of one or more computing systems and/or devices that may implement the various techniques described herein. The computing device 902 may be, for example, a server of a service provider, a device associated with a client (e.g., a computing device 110), an on-chip system, a wearable device 102, and/or any other suitable computing device or computing system. In at least some case, the computing device 902 is configured to include or make use of a band 104 having an adjustable bending force assembly as described herein.

The example computing device 902 is further illustrated as having a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, tactile-response device, and so forth. The computing device 902 may further include various components to enable wired and wireless communications including for example a network interface card for network communication and/or various antennas to support wireless and/or mobile communications. A variety of different types of antennas suitable are contemplated including but not limited to one or more Wi-Fi antennas, global navigation satellite system (GNSS) or global positioning system (GPS) antennas, cellular antennas, Near Field Communication (NFC) 214 antennas, Bluetooth antennas, and/or so forth. Thus, the computing device 902 may be configured in a variety of ways as further described below to support user interaction.

Various techniques may be described herein in the general context of software, hardware elements, or program modules. Generally, such device modules 914 include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the device modules 914 and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 902, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules input manager module 220, operating system 206, applications 208 and other program modules may be implemented as one or more instructions and/or logic embodied on some form of computer-readable media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 1004) to implement techniques, modules, and examples described herein. The environment 900 further depicts that the computing device 902 may be communicatively coupled via the network 108 to a service provider 120, which enables access to and interaction with various resources 122 made available by the service provider 120, examples of which were discussed in relation to FIG. 1.

Example Implementations

Example implementations of techniques described herein include, but are not limited to, one or any combinations of one or more of the following examples:

Example 1

An apparatus comprising: an arcuate shaped band configured to secure to an object by bending force exerted when the object is positioned within an open interior portion formed between opposing ends of the band; and an adjustable bending force assembly including one or more stiffener elements arranged in planar relationship to the band and positionable at multiple positions radially along a length of the band to adjust the bending force that is exerted.

Example 2

An apparatus as described in any one or more of the examples in this section, wherein the one or more stiffener elements are formed from material that is more rigid than the band and designed to change the rigidity of the band when moved to different positions.

Example 3

An apparatus as described in any one or more of the examples in this section, wherein the one or more stiffener elements comprise substantially rectangular plates.

Example 4

An apparatus as described in any one or more of the examples in this section, wherein the adjustable bending force assembly further includes a positioner element extending at least partially along a surface of the band designed to facilitate moving and securing of the stiffeners at the multiple positions.

Example 5

An apparatus as described in any one or more of the examples in this section, wherein the one or more stiffener elements are configured to attach to the positioner element and are slidably positionable into different positions along a length of the positioner element to adjust the bending force.

Example 6

An apparatus as described in any one or more of the examples in this section, wherein the one or more stiffener elements are configured to removably snap together with the positioner element at the multiple positions.

Example 7

An apparatus as described in any one or more of the examples in this section, wherein the one or more stiffener elements are removably attachable to the positioner element at the multiple positions with mechanical fasteners.

Example 8

An apparatus as described in any one or more of the examples in this section, wherein the apparatus is fixedly connected to device components to form an integrated wearable device.

Example 9

An apparatus as described in any one or more of the examples in this section, wherein the apparatus is configured as an attachable band for a compatible device and includes a connector designed to physically connect to the compatible device and secure the compatible device in a removable, non-permanent manner.

Example 10

An apparatus as described in any one or more of the examples in this section, wherein the apparatus comprises an adjustable headband device.

Example 11

A wearable device comprising: an arcuate shaped band configured to secure to a body part of a user by bending force exerted when the body part is inserted within an open interior portion formed between opposing ends of the band; and an adjustable bending force assembly including: at least one stiffener element arranged in planar relationship to the band and positionable at multiple positions radially along a length of the band to adjust the bending force that is exerted; and a positioner element extending at least partially along a surface of the band designed to facilitate moving and securing of the stiffeners at the multiple positions.

Example 12

A wearable device as described in any one or more of the examples in this section, wherein the adjustable bending force assembly includes two stiffener elements arranged on opposing sides of the band and each stiffener element is configured to enable control over rigidity and bending force for a corresponding side of the band.

Example 13

A wearable device as described in any one or more of the examples in this section, wherein the two stiffener elements are configured as slotted rectangular plates designed to engage with one or more complementary protrusions implemented by the positioner element.

Example 14

A wearable device as described in any one or more of the examples in this section, wherein the two stiffener elements are configured to removably snap together with the positioner element at the multiple positions.

Example 15

A wearable device as described in any one or more of the examples in this section, wherein the at least one stiffener element is slidably positionable into different positions along a length of the positioner element.

Example 16

A wearable device as described in any one or more of the examples in this section, wherein the at least one stiffener element includes one or more protrusions configured to engage with one or more complementary indentations of the positioner element to attach the stiffener element to the band and enable positioning of the stiffener element at the multiple positions.

Example 17

A system comprising: a device having one or more components to implement computing functionality; and an apparatus physically connected to the device and configured to secure to an object, the apparatus including: a band configured to exert bending force when the object is positioned within an open interior portion formed between opposing ends of the band and thereby attach to the object; and an adjustable bending force assembly including: multiple stiffener elements arranged in planar relationship to the band and positionable at different positions radially along a length of the band to adjust the bending force that is exerted; and a positioner element extending at least partially along a surface of the band having multiple attachment points designed to facilitate moving and securing of the stiffeners at the different positions.

Example 18

A system as described in any one or more of the examples in this section, wherein the apparatus is removably connected to the device via a connector that enables attachment and detachment of the device with manual force.

Example 19

A system as described in any one or more of the examples in this section, wherein the apparatus is fixedly connected to the device to form an integrated wearable device.

Example 20

A system as described in any one or more of the examples in this section, wherein the multiple stiffener elements are configured as plates that slide along the positioner element via the attachment points into the different positions.

CONCLUSION

Although aspects have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:
1. An apparatus comprising:
an arcuate shaped band configured to secure to an object by a bending force exerted when the object is positioned within an open interior portion formed between opposing ends of the band; and
an adjustable bending force assembly including:
one or more stiffener elements arranged in planar relationship to the band and positionable at multiple positions radially along a length of the band to adjust the bending force that is exerted; and
a positioner element extending at least partially along a surface of the band designed to facilitate moving and securing of the one or more stiffener elements at the multiple positions, the one or more stiffener elements configured to removably snap together with the positioner element at the multiple positions.
2. The apparatus as recited in claim 1, wherein the one or more stiffener elements are formed from material that is more rigid than the band and designed to change rigidity of the band when moved to different positions.
3. The apparatus as recited in claim 2, wherein the one or more stiffener elements comprise substantially rectangular plates.

4. The apparatus as recited in claim 1, wherein the one or more stiffener elements are slidably positionable into different positions along a length of the positioner element to adjust the bending force.
5. The apparatus as recited in claim 1, wherein the one or more stiffener elements are removably attachable to the positioner element at the multiple positions with mechanical fasteners.
6. The apparatus as recited in claim 1, wherein the apparatus is fixedly connected to device components to form an integrated wearable device.
7. The apparatus as recited in claim 1, wherein the apparatus is configured as an attachable band for a compatible device and includes a connector designed to physically connect to the compatible device and secure the compatible device in a removable, non-permanent manner.
8. The apparatus as recited in claim 1, wherein the apparatus comprises an adjustable headband device.
9. A wearable device comprising:
an arcuate shaped band configured to secure to a body part of a user by a bending force exerted when the body part is inserted within an open interior portion formed between opposing ends of the band; and
an adjustable bending force assembly including:
at least two stiffener elements arranged in planar relationship to the band and positionable at multiple positions radially along a length of the band to adjust the bending force that is exerted, the at least two stiffener elements arranged on opposing sides of the band and each stiffener element configured to enable control over rigidity and the bending force for a corresponding side of the band; and
a positioner element extending at least partially along a surface of the band designed to facilitate moving and securing of the at least two stiffener elements at the multiple positions, the at least two stiffener elements configured as slotted rectangular plates designed to engage with respective complementary protrusions in the positioner element.
10. The wearable device as recited in claim 9, wherein the at least two stiffener elements are configured to removably snap together with the positioner element at the multiple positions.
11. The wearable device as recited in claim 9, wherein the at least two stiffener elements are slidably positionable into different positions along a length of the positioner element.
12. The wearable device as recited in claim 9, wherein the at least two stiffener elements are formed from material that is more rigid than the band and designed to change the rigidity of the band when moved to the multiple positions.
13. The wearable device as recited in claim 9, wherein the band is configured as an attachable band for a compatible device and includes a connector designed to physically connect to the compatible device and secure the compatible device in a removable, non-permanent manner.
14. A system comprising:
a device having one or more components to implement computing functionality; and
an apparatus physically connected to the device and configured to secure to an object, the apparatus including:
a band configured to exert a bending force when the object is positioned within an open interior portion formed between opposing ends of the band and thereby attach to the object; and an adjustable bending force assembly including:
multiple stiffener elements arranged in planar relationship to the band and positionable at different positions radially along a length of the band to adjust the bending force that is exerted; and
a positioner element extending at least partially along a surface of the band having multiple attachment points designed to facilitate moving and securing of the multiple stiffener elements at the different positions, the multiple stiffener elements configured to removably snap together with the positioner element at the different positions.

15. The system as recited in claim 14, wherein the apparatus is removably connected to the device via a connector that enables attachment and detachment of the device with manual force.

16. The system as recited in claim 14, wherein the apparatus is fixedly connected to the device to form an integrated wearable device.

17. The system as recited in claim 14, wherein the multiple stiffener elements are configured as plates that slide along the positioner element via the attachment points into the different positions.

18. The system as recited in claim 14, wherein the multiple stiffener elements include one or more protrusions configured to engage with respective complementary indentations of the positioner element to attach the multiple stiffener elements to the band and enable positioning of the multiple stiffener elements at the different positions.

19. The system as recited in claim 14, wherein the multiple stiffener elements are formed from material that is more rigid than the band and designed to change rigidity of the band when moved to the different positions.

20. The system as recited in claim 14, wherein the multiple stiffener elements are slidably positionable into the different positions along a length of the positioner element to adjust the bending force.

* * * * *